(12) United States Patent
Rothermel et al.

(10) Patent No.: US 7,271,843 B2
(45) Date of Patent: Sep. 18, 2007

(54) METHOD AND APPARATUS FOR ANALYZING A DIGITALLY CONVERTED ANALOGUE SIGNAL

(75) Inventors: Albrecht Rothermel, Neu-Ulm (DE); Roland Lares, Ulm (DE)

(73) Assignee: Thomson Licensing, Boulogne, Billancourt (FR)

( * ) Notice: Subject to any disclaimer, the term of this patent is extended or adjusted under 35 U.S.C. 154(b) by 450 days.

(21) Appl. No.: 10/483,033

(22) PCT Filed: Jun. 24, 2002

(86) PCT No.: PCT/EP02/06933

§ 371 (c)(1),
(2), (4) Date: Jan. 6, 2004

(87) PCT Pub. No.: WO03/005704

PCT Pub. Date: Jan. 16, 2003

(65) Prior Publication Data

US 2004/0174461 A1    Sep. 9, 2004

(30) Foreign Application Priority Data

Jul. 6, 2001    (EP) ................................. 01401811

(51) Int. Cl.
*H03L 7/00*    (2006.01)
(52) U.S. Cl. ........................ 348/540; 348/531
(58) Field of Classification Search ........... 348/194, 348/540, 541, 531, 533; 386/48–50, 85, 386/89, 90; 331/20; 702/71, 72
See application file for complete search history.

(56) References Cited

U.S. PATENT DOCUMENTS

| | | | | |
|---|---|---|---|---|
| 4,220,967 | A | | 9/1980 | Ichida et al. ................. 358/105 |
| 4,607,290 | A | * | 8/1986 | Murakami ................... 358/410 |
| 5,119,193 | A | | 6/1992 | Noji ........................... 358/166 |
| 5,497,202 | A | * | 3/1996 | Kim ........................... 348/536 |
| 5,515,108 | A | * | 5/1996 | Kim ........................... 348/498 |
| 5,594,506 | A | | 1/1997 | Yang ........................... 348/531 |
| 5,608,460 | A | * | 3/1997 | Rothermel et al. .......... 348/525 |
| 5,638,131 | A | * | 6/1997 | Parrish et al. .............. 348/537 |

FOREIGN PATENT DOCUMENTS

| | | |
|---|---|---|
| EP | 0899945 | 3/1999 |
| JP | 08116466 A * | 5/1996 |

OTHER PUBLICATIONS

Copy of search report dated Sep. 18, 2002.

* cited by examiner

*Primary Examiner*—Victor R. Kostak
(74) *Attorney, Agent, or Firm*—Joseph J. Laks; Robert D. Shedd; William A. Lagoni

(57) ABSTRACT

A method for obtaining line synchronization information items from a video signal is proposed. The inventive method is based on convolving the relevant part of an analogue video line signal with a pattern function. The result of the convolution operation is further processed to determine the time instants of the occurrence of the horizontal sync signals. The time instants are subsequently filtered to generate horizontal pulses. A video line memory allows to utilize subsequent horizontal sync signals for calculating the horizontal sync pulse of a current video line. The invention also relates to an apparatus for carrying out the method.

14 Claims, 10 Drawing Sheets

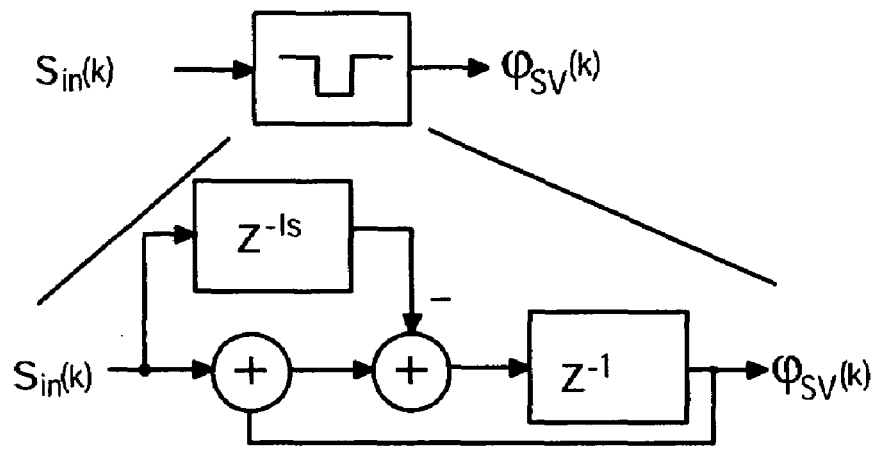
Fig.3
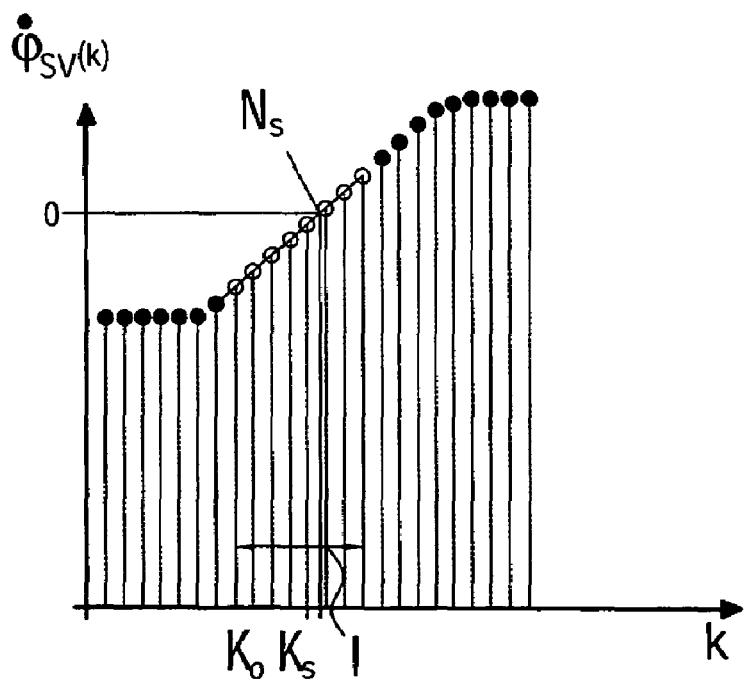
Fig.4
Fig.5 a)

big offset between fields "comb" structure b)

METHOD AND APPARATUS FOR ANALYZING A DIGITALLY CONVERTED ANALOGUE SIGNAL

This application claims the benefit, under 35 U.S.C. § 365 of International Application PCT/EP02/06933, filed Jun. 24, 2002, which was published in accordance with PCT Article 21(2) on Jan. 16, 2003 in English and which claims the benefit of European patent application No. 01401811.3, filed Jul. 6, 2001.

FIELD OF THE INVENTION

The invention relates to a method for obtaining line synchronization information items from a video signal. According to a second aspect the invention is related to an apparatus for generating a line synchronisation pulse for a video line signal.

BACKGROUND

In today's television receivers and computer TV cards it is necessary to separate synchronisation signals (or in short: sync signals) to achieve a proper representation of the video image on the display, e.g. a cathode ray tube.

Even though digital system solutions will become increasingly predominant in future television technology, analogue source signals will still exist for many years in the future. Examples include the terrestrial reception of video signals, which is still widespread to date, and the analogue recording methods, e.g. according to the VHS standard in the case of video recorders. Such analogue signal sources represent critical signal sources for digital systems, and their signal processing requires special measures. The situation is the same for future multimedia terminals as long as they are equipped with an analogue video input. Due to the existence of large quantities of analogue video material, e.g. VHS tape libraries, it is unlikely that the use of analogue video signals could disappear in the near future.

Conventionally, a sync slicer is used for sync separation. The sync slicer is combined with a PLL (Phase Locked Loop) for "smoothing" the extracted sync information. The PLL technology is mature but has well known limitations due to two conflicting requirements: On the one hand the PLL must have a low-pass characteristic to suppress disturbances in the sync signal detection caused by noise. On the other hand, tape recorders, in particular camcorders, output the video signal on a variable time base due to mechanical tolerances. The time base variations also appear as disturbances of the sync signal to the PLL. However, this kind of disturbance has to be passed through without attenuation because any alterations of the time base would create horizontal instabilities of the displayed video picture. In other words: The PLL has to suppress noise on the one hand and has to pass time-base variations on the other hand. Fortunately, the two effects are distinguishable by their frequency. Time-base variations are a low frequency effect above 1 kHz. As the PLL is always a second order loop, corner frequencies and stability are selected in every new designed system for best compromise.

Television receivers with digital signal processing (e.g. in the case of the 100 Hz technology) have been operating, as a rule, with clock systems, which are synchronized with the respective input signal. Since the input signal is the analogue CVBS signal, either the horizontal sync pulse (line-locked clock) or, alternatively, the colour subcarriers or colour synchronizing pulses (burst) (colour subcarrier-locked clock) are frequently used as reference point for the synchronization. The sync separation in the video lines has usually been carried out to date by means of analogue methods using so-called sync separator stages and a PLL filter stage connected downstream. In television receivers with digital signal processing, a PLL filter stage, which is a digital realization of the known analogue sync signal processing is commonly used. The filter stage is then a digital PLL (Phase-Locked Loop). Examples of such digital PLL circuits are the circuits SAA 7111 from Philips, HMP 8112 from Harris and Digit 3000 from Micronas. The principal problem with such digital PLL circuits is that the known instabilities in the picture occur when the input signal present is an analogue video signal picked off from an analogue video recorder, which is currently operating in the search mode (fast forward or reverse run). Many users of analogue video recorders are sufficiently acquainted with such instabilities. Specifically, disturbing horizontal stripes appear in the picture when the video recorder is operating in the search mode. These disturbing stripes originate from the fact that in the search mode, the video heads no longer run on a single slanted track but rather sweep across two or more slanted tracks, depending on the search speed. During the transition from one slanted track to the next, abrupt sudden phase changes arise with regard to the occurrence of the sync pulses of the video lines. These sudden phase changes are actually governed by the geometry in magnetic tape recording in accordance with the slanted track method. The sudden phase changes are therefore determined by the system and, in addition, virtually unavoidable.

Irregular occurrence of line sync pulses also arises, however, in the case of video signals generated by camcorders. In this case, the instabilities that occur are, as a rule, more severe than in the case of a normal video recorder, because the regulation of the head-drum speed is subject to greater fluctuations on account of the larger component tolerances.

EP-A 0 266 147 discloses a digital PLL circuit for a television receiver. In the case of this digital PLL circuit, in order to avoid the abovementioned problem in the search operating mode in video recorders, a switching unit is provided which drastically shortens the time constant of the phase-locked loop in the event of identification of a sudden phase change caused by the head changeover at the end of a slanted track, with the result that the region of instability in the picture is reduced in size. The disadvantage of this solution is that the reduction of the time constant of the phase-locked loop provided by this solution means that noise components in the video signal are able to be suppressed less well and disturbing lines still remain visible, even though to a lesser extent than when the time constant is larger.

In EP-A 0 899 945 a method is for obtaining line synchronization information is described. According to the known method a video line is convoluted with an idealized horizontal synchronization pulse. The result of the convolutions processed in an open loop system replacing the PLL. The open loop system is realized by a linear regression to extrapolate the best guess of a current sync pulse using past sync pulses.

Convolving, or convolution, is a well-known term meaning the integral of one function multiplied by another function, which is shifted in time, see for example in "New IEEE Standard Dictionary of Electrical and Electronics Terms", 1993.

Using the known systems as a starting point it is desirable to have a method providing an even better performance with regard to horizontal synchronization of the video lines.

SUMMARY OF THE INVENTION

The present invention suggests a method for obtaining line synchronization information from a video line signal. According to the inventive method the relevant part of the video line signal is analysed to determine time instants defining the temporal position of the line synchronization pulses. A predetermined number of video lines is stored in a line delay. Using this as a data base a filtered time instant for a video line preceding the currently received video line by the number of video lines stored in the line delay.

In an embodiment of the invention the calculation is an interpolation of the time instants determined for video lines preceding and following the currently displayed video line. Specifically, in another embodiment the interpolation is a linear interpolation.

In order to define the time instants of the synchronization pulses precisely it is suggested to convolute the entire or relevant part of the video line with a pattern function. An idealized synchronization pulse may be used as the pattern function.

According to the second aspect of the invention an apparatus for generating line synchronization pulses from a video line signal is suggested. The inventive apparatus comprises means for analysing the entire or the relevant part of the video line to determine time instants defining the temporal position of the line synchronization pulses. The apparatus further includes a line delay for storing a number of video lines. Finally, means are provided for calculating a filtered time instant for a video line preceding the currently received video line by the number of video lines stored in the line delay.

In another embodiment the apparatus comprises means for convolving the entire or the relevant part of the video line with a pattern function.

In yet another embodiment the apparatus is provided with an FIR filter having a set of predetermined filter constants.

BRIEF DESCRIPTION OF THE DRAWING

Exemplary embodiments of the invention are illustrated in the drawings and are explained in more detail in the following description. In the figures it is shown:

FIG. 3 a diagrammatic illustration of a convolution operation of two square-wave pulses;

FIG. 4 the structure of an MTA filter (moving time average) for carrying out the convolution operation;

FIG. 5 a diagrammatic illustration for the calculation of the zero of the first derivative of the result function of the convolution operation according to the invention;

DETAILED DESCRIPTION OF THE PREFERRED EMBODIMENT

Figure 1:
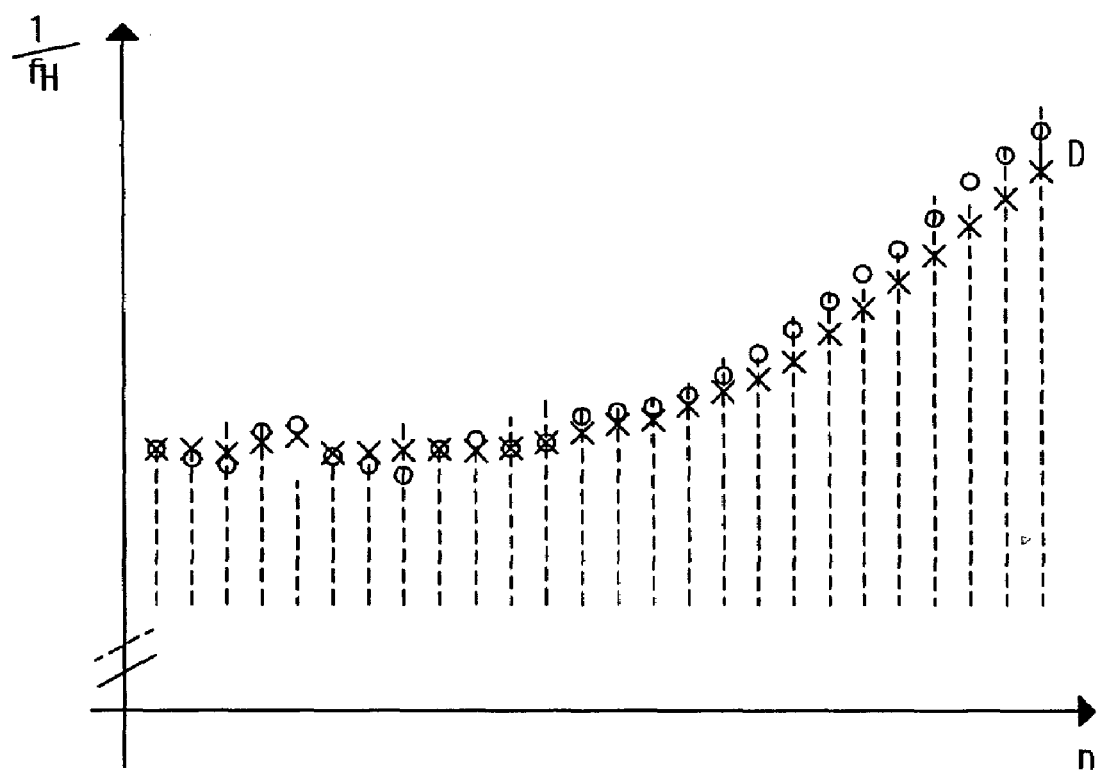
FIG. 1 simulated results for the reciprocal of the current horizontal frequency of line sync pulses in a video signal, which has been picked off from a camcorder.

Simulated values for the position of the line sync pulses in a video signal are plotted in FIG. 1. The number of the respective line is plotted in the direction of the abscissa in FIG. 1. The reciprocal of the current horizontal frequency $1/f_H$ for the line sync pulses is plotted in the direction of the ordinate of FIG. 1. The letter "n" generally designates the line number of each video line. The plotting of the reciprocal of the current horizontal frequency means that the time-domain positions of the respective line sync pulses can be compared with one another. The values corresponding to the actual measured values for the individual positions of the line sync pulses are in each case specified by the broken vertical lines. The end of each broken vertical line then specifies the line sync pulse position established. If the video signal present were ideal, then all of the broken lines would have the same length. The illustration is made for a video signal generated by a camcorder. Fluctuations in the line sync pulse positions about an average value are clearly discernible in a first region of FIG. 1. A steady increase in the line sync pulse positions can be discerned in a second part of FIG. 1. This behaviour can be explained by the regulation of the speed of rotation of the head-drum, this regulation being slow to start. Component tolerances and noise may be responsible for the variations of the line sync pulses about an average value. The crosses in FIG. 1 specify the line sync pulse positions corrected by the PLL circuits, which are usually used in the television receivers. However, the regulating behaviour of this PLL circuit results in the outputting of a phase error with regard to the line sync pulse positions as long as the vertical frequency in the video signal steadily changes. This is clearly discernible in the second part of FIG. 1 from the difference between the crosses and the broken lines. Since the sign of this phase error may be randomly distributed in the individual sub pictures and, in addition, the value of the phase error likewise does not always remain constant, the phase deviation D is manifested as a visible disturbance in the video picture displayed. The disturbance corresponds to a horizontal jitter effect in large parts of the picture. The picture gives the impression that somebody is shaking it in the horizontal direction. In order to eliminate the phase error with frequency changes occurring in the video signal, it is customary in the case of an analogue PLL control loop to increase the bandwidth of the PLL circuit. If this measure is taken, then the line sync pulse positions, which are indicated by circles in FIG. 1 are produced. However, this solution has the disadvantage that the noise suppression of the PLL circuit is impaired, as a result of which momentary picture disturbances in the form of a jitter behaviour are still discernible. Vertical lines no longer appear straight but rather distorted.

Figure 2:
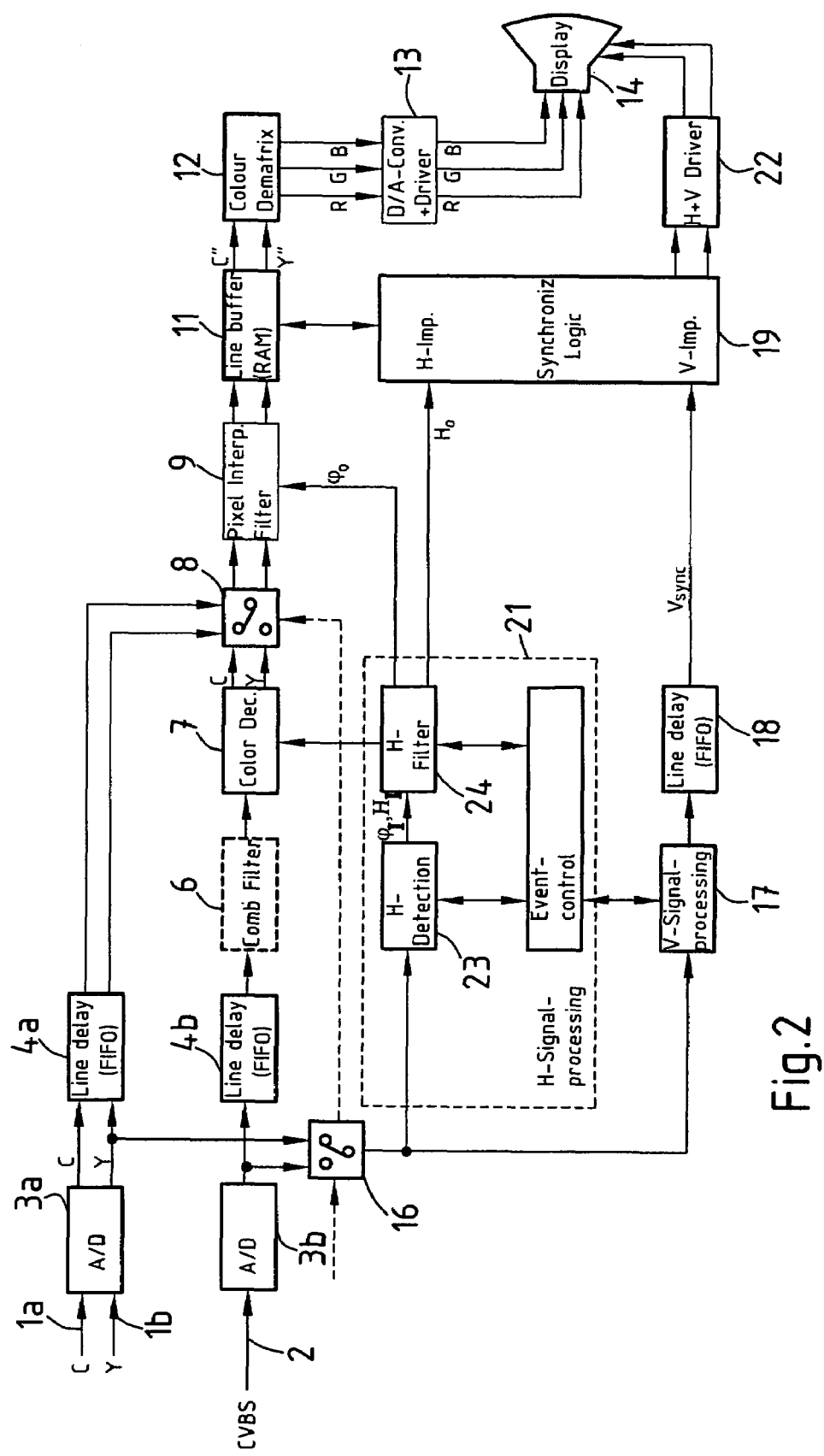
FIG. 2 a top level block diagram for baseband sync and video processing.

FIG. 2 shows a top level diagram of the sync and video processing of a TV incorporating the present invention.

The proposed architecture is based on a free running system clock, e.g. a crystal oscillator. Hence, the system clock has no correlation to the video sync or colour subcarrier frequencies. The free running system clock is particularly advantageous for processor-based systems adapted to receive video signals of various types and properties. However, colour burst-locked clocked systems are also possible to realize with the architecture described in the following if this is desirable for certain embodiments.

On the left hand side of FIG. 2 the inputs for analogue base band video signals are shown. The inputs 1a and 1b are used for S video signals having separate chrominance C and luminance Y inputs. The input 2 is provided for receiving composite video signals. The analogue video signals are converted into corresponding digital signals by A/D converters 3a and 3b, respectively. The digital output signals are then stored in FIFO (first-in-first-out) line delays 4a and 4b, respectively, having a size of e.g. eight video lines. The FIFO line delays are necessary for filtering time data used in horizontal sync processing, as it will be described further below.

In the signal path processing the composite video signal a comb filter is provided to separate the luminance Y and the chrominance C signals. Subsequently, the signals are fed into a chrominance decoder to generate the luminance signal Y and the chrominance signal C.

A switch 8 is controlled to select the luminance and chrominance signals received from line delay 4a or from chroma decoder 7 to be further processed in a pixel interpolation filter 9, which will be described in more detail below.

The output of filter 9 is buffered in a line buffer 11 and passed on to a colour dematrix 12 for generating digital R, G, B signals. The digital R, G, B signals are converted into analogue signals, amplified by associated drivers in block 13 and supplied to a cathode ray tube 14 for display.

In case a display device different than a CRT, e.g. an LCD, TFT or plasma display is used, the signal processing may be different than shown in the present embodiment. However, these differences do not depart from the scope of the present invention.

For synchronization signal processing a digital luminance signal Y or a digital composite video signal is selectively used depending on which analogue inputs are active. The signal for sync signal processing is selected by switch 16 controlled by the same control signal as the switch 8. The vertical sync processing in block 17 is conventional and is therefore not described in more detail. The information regarding which field of a video frame is currently being processed is also obtained in this unit. The vertical sync signal $V_{sync}$ is delayed in a line delay 18 to re-establish the timing to the video signals delayed in the line delays 4a and 4b, respectively.

The $V_{sync}$ signal is input to a microprocessor 19, which is among other functions operative to execute the synchronization logic.

In a $H_{sync}$ processing unit 21 the $H_{sync}$ signals are detected and processed by the inventive method, which will be described in more detail below. The horizontal sync information is supplied to the µP 19. The µP 19 uses the horizontal and vertical sync information to generate output signals for a deflection driver 22 being connected to a deflection apparatus not shown in FIG. 2.

The deflection apparatus is associated with the CRT 14 and effects the scanning of the electron beams inside the CRT in a conventional way.

In case the display device is not a CRT the deflection driver 22 is replaced by an appropriate device effecting the representation of the video signal line by line on the screen of the respective display device.

The $H_{sync}$ processing unit 21 comprises a $H_{sync}$ detector 23 to determine the timing of $H_{sync}$ signals contained in the received video signal. The $H_{sync}$ signals are filtered in a H-filter 24 and the resulting signals $H_o$ and $\phi_o$ are provided to the µP19 and to the pixel interpolation filter 9. The operation of the $H_{sync}$ detector 23, the H-filter 24 and the $V_{sync}$ processor 17 is controlled by an event control 25, which will be described in more detail in connection with FIG. 8.

In contrast to the otherwise widespread edge detection for the falling edge of a line sync pulse in the CVBS signal, the present $H_{sync}$ detector 23 operates according to the correlation principle. In this case, the CVBS signal is convolved with an ideal line sync pulse and then the minimum is sought. This principle is illustrated in FIG. 3, where it is possible to discern in principle that the convolution operation of two square-wave pulses generates a triangle function as result function. This function then has a minimum or maximum, which specifies the position of the line sync pulse. The CVBS signal for a video line is designated by the reference symbol $f_{in}(k)$. The reference symbol $S_{ideal}(k)$ designates an ideal line sync pulse. The result function of the convolution operation is designated by the reference symbol $\phi_{SV}(k)$. The reference symbol $k_s$ specifies the position of the minimum of the result function. The convolution operation is carried out in the $H_{sync}$ detector 23 for example in such a way that the CVBS signal present in one of the line stores 4a, 4b for a video line is digitally convolved with a corresponding ideal line sync pulse. The execution may alternatively be configured in such a way that instead of the CVBS signal for the entire video line being convolved with the ideal line sync pulse, only the relevant part for the line sync pulse is convolved with the idealized line sync pulse.

This detection method behaves extremely robustly even for example in the case of terrestrial signals with multipath propagation which are subjected to a great deal of interference. If a constant correlation length $l_s$ is used for the convolution operation, the MTA (Moving Time Average) filter known from the prior art is suitable, for example for the circuitry realization of the convolution operation, the structure of which filter is illustrated in FIG. 4, where the line sync pulse is represented in an idealized manner with a square-wave pulse response.

In order to determine the maximum or minimum in the result function of the convolution operation, the zero of the first derivative of the result function is calculated. This computation operation is illustrated in more detail in FIG. 5, where the reference symbol $\phi_{SV}^{(k)}$ designates the first derivative of the result function, the variable k stands for the respective sample of the derivative function, $k_s$ specifies the position of the zero of the derivative and $k_0$ specifies the last sample with a negative sign in the transition region of the first derivative of the result function. For an exact determination of the zero, a linear regression is carried out in the transition region of the derivative function. The zero is then calculated in a simple manner using the regression line established. The point of intersection of the regression line with the zero axis is designated by the reference symbol $N_s$ in FIG. 5. The regression length $l_v$ amounts to nine samples in the example illustrated. In this way, the minimum of the first derivative is calculated with subpixel resolution. The subpixel resolution is necessary since the subsequent vertical filtering cannot effectively eliminate pixel quantization. The subpixel resolution is also necessary because, e.g. given a sampling rate of 18 MHz for the A/D conversion in the A/D conversion unit 20 and a display having a width of 56 cm, the visibility limit for picture details is approximately 0.17 pixel. Investigations with various input signals have shown that a linear regression yields an optimum result for the calculation of the subpixel resolution. For the calculation of the centre of the line sync pulse, which corresponds to the minimum of the result function of the convolution operation, approximately 10 samples are sufficient for the region around the zero of the derivative function. The computation rule that approximately 10 samples are sufficient was established at a sampling rate of 18 MHz using video signals having a constant horizontal frequency for various signal-to-noise ratios in the case of terrestrial reception. In this case, the standard deviation for a signal having a signal-to-noise ratio of 15 dB was 0.93 pixel. In the case of a low-noise signal having a signal-to-noise ratio of 35 dB, the standard deviation is 0.07 pixel.

If video signals originating from video recorders are processed, the horizontal frequency can deviate by up to 4% in the trick mode in video recorders, which also proportionally affects the length of the line sync pulse. This is then manifested in a deterioration in the identifiability of the edge in the course of the derivative function of the result function of the convolution operation. However, it has been shown that deviations up to this degree have no relevant influence on the detection accuracy in the course of the zero determination. For the calculation of the centre $k_s$ of the line sync pulse by means of linear regression, it is possible to use an arithmetic unit instead of a more complex microprocessor, since approximately 32 µs remain for this calculation, which corresponds to half of one video line in the PAL system. Moreover, the equidistant samples enable a distinct simplification of the calculation. The formula for the calculation of the centre $k_s$ of the line sync pulse with subpixel accuracy then reads as follows:

$$k_s = k_0 - k_l \frac{\sum_{i=1}^{l} \varphi_{SV}\left(i - \frac{l}{2}\right)}{\sum_{i=1}^{l} \left(\left(i - \frac{l}{2}\right)\varphi_{SV}\left(i - \frac{l}{2}\right)\right)}$$

In this case, $k_l$ is a constant, which can be calculated as a function of the regression length $l$. All the other symbols are known from the description regarding FIGS. 5 and 3.

Following the time base described in connection with FIG. 6 each video line duration $T_H$ can be calculated by the following equation:

$$T_H(n)=\Delta H_I(n)+\phi_I(n)-\phi_I(n-1).$$

For an undistorted PAL standard input signal the line duration is $T_H$=64 µs. With a constant system clock frequency of $f_{clk}$=18 MHz the number of clock cycles between two $H_{sync}$ pulses would be constant at $\Delta H_I$=1152. The phase difference between the $H_{sync}$ pulses and the beginning of a clock cycle would also be a constant value for all video lines.

However, in practice the video line duration is not constant but variable. Noise and low frequent distortions are super imposing the input video signal causing a time shift of the detected temporal position of the $H_{sync}$ pulse.

As a consequence the detected video line duration $T_H$ changes line by line causing horizontal jitter. To avoid this kind of jitter it is necessary to filter the detected temporal positions of the $H_{sync}$ pulses.

For each time instant $t_n$ the $H_{sync}$ detection block 23 outputs two values, $H_I$ and $\phi_I$. $H_I$ describes the time difference between two $H_{sync}$ pulses measured in integer cycles of the internal system clock. $\phi_I$ represents a fraction of one cycle allowing to determine the temporal position of a specific $H_{sync}$ pulse with subpixel resolution.

Figure 6:
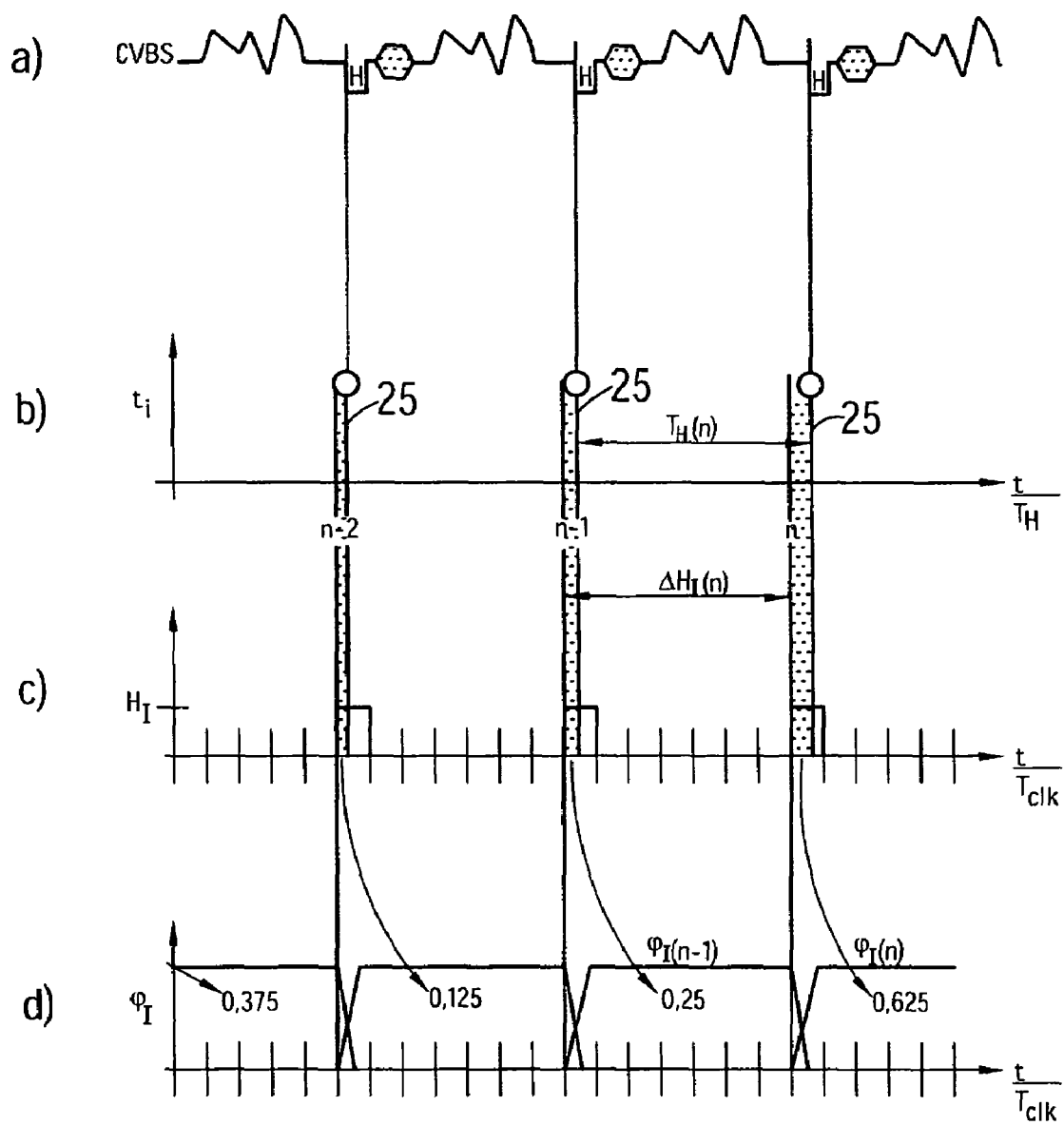
FIG. 6 a graphical illustration of the timing of the video signal, the horizontal sync signal and the system clock.

In FIG. 6 the details of the timing of the different signals are shown. FIG. 6a displays an analogue composite video signal CVBS with incorporated $H_{sync}$ pulses, which are indicated by "H". FIG. 6b illustrates the temporal position $t_i$ of the $H_{sync}$ pulses by vertical lines 25. The abscissa in FIG. 6b is divided into units of the nominal duration $T_H$ of a video line. The temporal position ti falls into a particular cycle of the system clock. The relevant cycles define the integer number $H_I$. A comparison between FIGS. 6b and 6c illustrates that the nominal beginning of a video line as shown in FIG. 6b coincides with the beginning of a cycle of the system clock as illustrated in FIG. 6c. However, FIG. 6b also shows that the temporal positions $t_i$ of the detected $H_{sync}$ pulses do not coincide with a cycle of the system clock. The time shift also discernible in FIG. 6b as a deviation from the nominal beginning of a video line is quantified by $\phi_I$. $\phi_I$ defines the fraction of a system clock cycle the respective $H_{sync}$ pulse lags behind the clock cycle.

Several examples of the time shift are illustrated in FIG. 6d with reference to FIG. 6c.

The time instants $t_i$ determined according to the described method are subsequently filtered in a horizontal filter 24. The horizontal filter 24 is a FIR filter having symmetrical filter coefficients.

Figure 7:
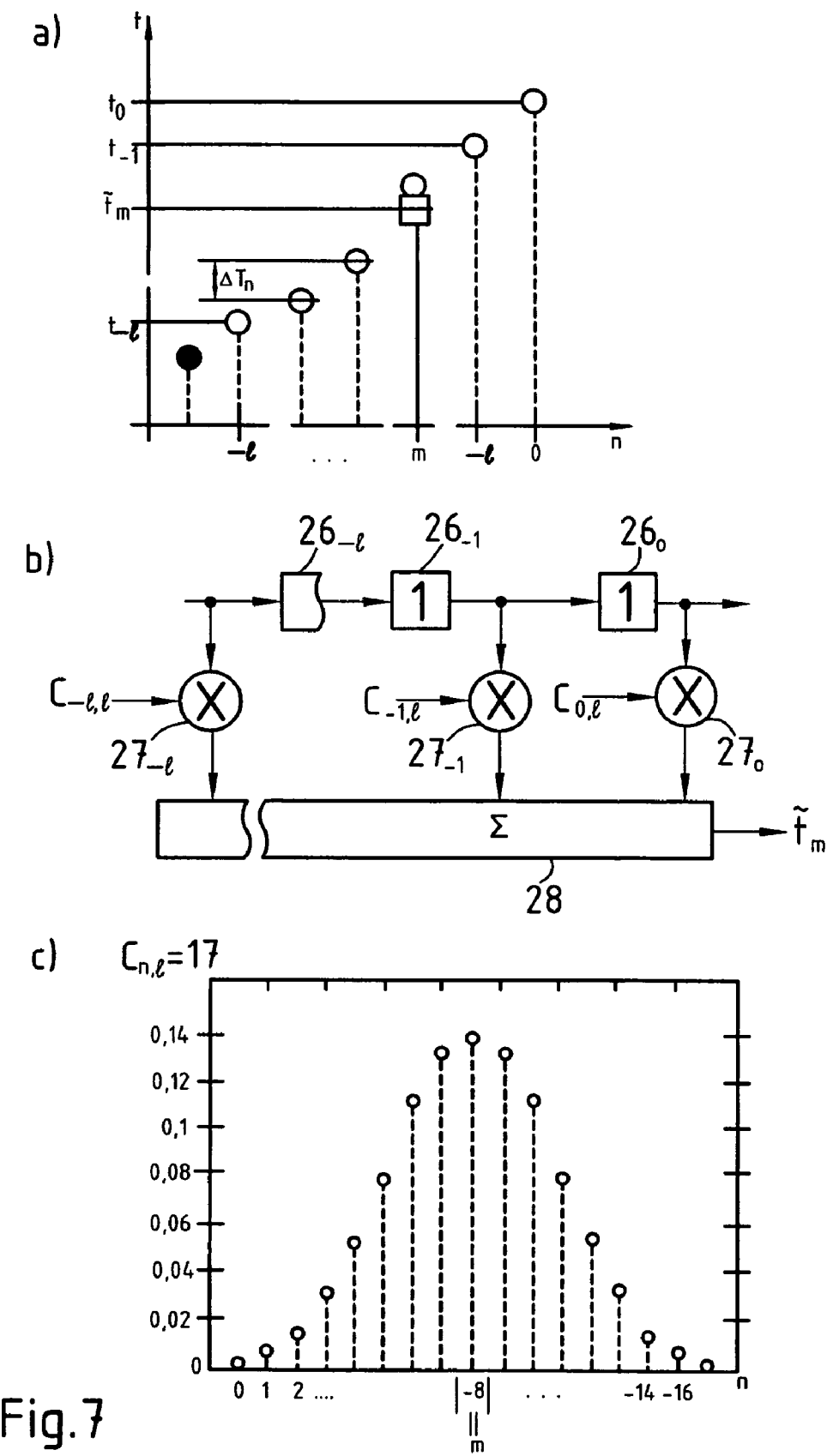
FIG. 7 the time positions of the horizontal sync pulses, a schematic structure of the FIR filter and a graphical representation of t he used filter coefficients.

At a given time the FIR filter 24 takes 1 line durations $\Delta T_n$, n=0, ..., 1 into account to calculate the filter output $T_m$ as it is illustrated in FIG. 7a. One line duration $\Delta T_n$ is the time difference between two $H_{sync}$ pulses n and n+1, defined by the time instants $t_n$ and $t_{n+1}$.

The FIR filter then calculates the filter output signal according to the equation $$T_m = \sum_{n=0}^{-l} Cn, l \cdot tn$$

where $C_{n,1}$ are the filter coefficients, (l+1) is the filter length, and $t_n$ the time instants of the $H_{sync}$ pulses. In FIG. 7b the FIR filter 24 is shown in more detail. The time instants are stored in delay stages $26_{-1} \ldots 26_o$. The contents of the delay stages is multiplied with the associated filter coefficient $c_{n,m}$ in multipliers $27_{-1} \ldots 27_o$. The individual products are summed up in an adder 28 to yield the filter output $T_m$. The index m of the calculated filter output $T_m$ is related to the number of video lines that can be stored in the line delay 4a or 4b. In the present embodiment the line delay has a size of eight video lines and therefore m=7. In other embodiments having a different size of line delay m may take a different value.

It is important to note that this filter design does not contain any feedback of a previous result to a subsequent result. The output of the horizontal filter depends exclusively on the input signals, i.e. the detected time instants $t_i$. The H-filter 24 is an open loop filter.

The horizontal filter outputs the filtered temporal position of the $H_{sync}$ pulse in terms of values $H_o$ and $\phi_o$ indicating the length of the video line in terms of a number of system clock cycles and a phase shift relative to the system clock, respectively. The time correction of the video signal is done by the pixel interpolation filter block 9, which is arranged to shift each video line in time with subpixel resolution corresponding to the value of $\phi_o$, wherein $o \leq \phi_o \leq 1$. The output signal $H_o$ of the H filter defines the start of each new video line with the accuracy of one system clock cycle.

In the previous paragraphs it has been shown that the $H_I$ pulse in connection with the additional phase information $\phi_I$ is used as input for the H-filter 24. The summed up time information of each $H_{sync}$ pulse ($\Delta H_I + \phi_I$) is stored for a defined number of lines, which equals the FIR filter length.

In the present embodiment of the inventive apparatus the time measurement is implemented by means of counters, requiring only a few basic hardware components. A practical realization is shown in FIG. 8.

Figure 8:
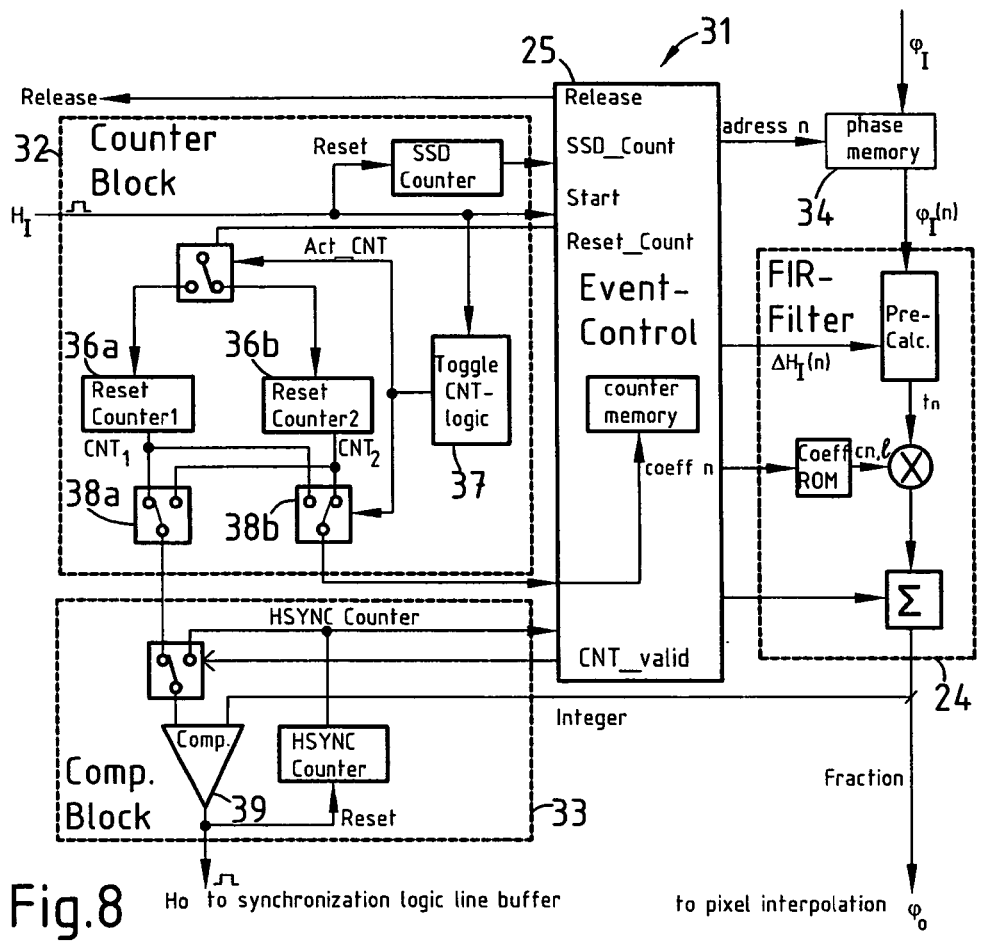
FIG. 8 the circuit section handling the time management of the synchronisation signal processing.

FIG. 8 shows in more detail the circuit section being effective for the time management. The time management circuit section, which is referenced as a whole with the reference number 31, is structured into several blocks comprising a counter block 32, a comparator block 33, a phase memory 34, the FIR filter 24 and an event control 25. The details of the FIR filter 24 have already been described in connection with FIG. 7b.

The counter block 32 includes two counters 36a, 36b to measure the time difference between the occurrences of two subsequent $H_I$ signals in units of clock cycles. The $H_I$ signal is also supplied to the event control 25 outputting a counter reset signal. During normal operation the counter reset signal corresponds the $H_I$ signal.

A counter control unit 37 controls a switch 38 to connect the counter reset signal emitted by the µP 19 with either counter 36a or counter 36b for resetting it. At the same time the counter control unit 37 operates two further switches 39a and 39b to connect the output of the respective counter, which is not reset to one input of a comparator 41. The second input of the comparator 41 is provided with the predicted value calculated in the H-filter 24. The calculation is based on past and future $H_I$ values. If the two input values of the comparator 41 are equal it outputs the $H_O$ pulse.

Figure 9:
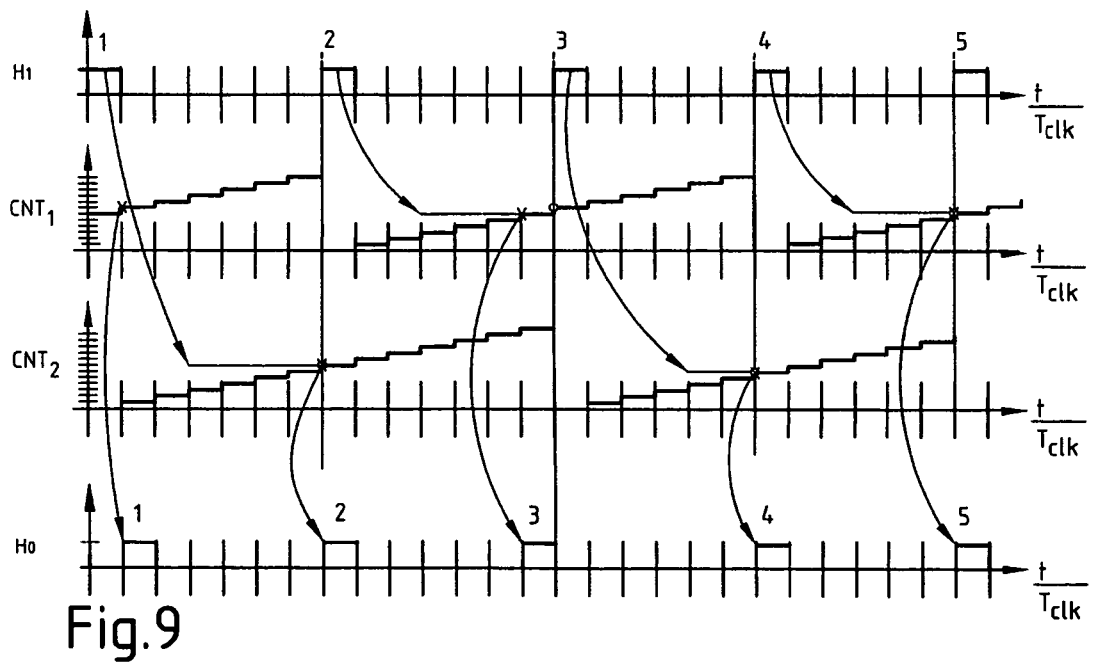
FIG. 9 the timing of the counters incorporated in the time management circuit section.

FIG. 9 shows the timing of the $H_I$ signal, the $H_O$ pulse and the contents of the counters 36a, 36b. One counter counts each $H_I$ pulse and the other counts the number of clock cycles for counter memory storage (circle) and output comparison (cross) and vice versa. Or in other words: The selected counter for output comparison counts the number of clock cycles from the last input pulse $H_I$ until the output pulse is generated by the prediction value (cross in FIG. 9). At the same time the selected filter is reset. Fractions of a clock cycle are not important for the counter time scheme. Fractional parts of a clock cycle are stored in the phase memory 34.

Some lines of delay/memory are needed for the new horizontal filter technique based on an interpolation principle. In this example, a 8 line delay block is used to delay the video signal by 8 video lines. This is needed, because the signal delay allows the H filter block to obtain timing information from past video lines (still stored in line memory), before the video signal is output to the pixel interpolation filter. After passing the pixel interpolation filter, the video lines are orthogonalized with the processed timing information of the H filter and further time corrections are not possible. Using this line delay, the filter behavior can be improved as shown in the next chapter.

Figure 10:
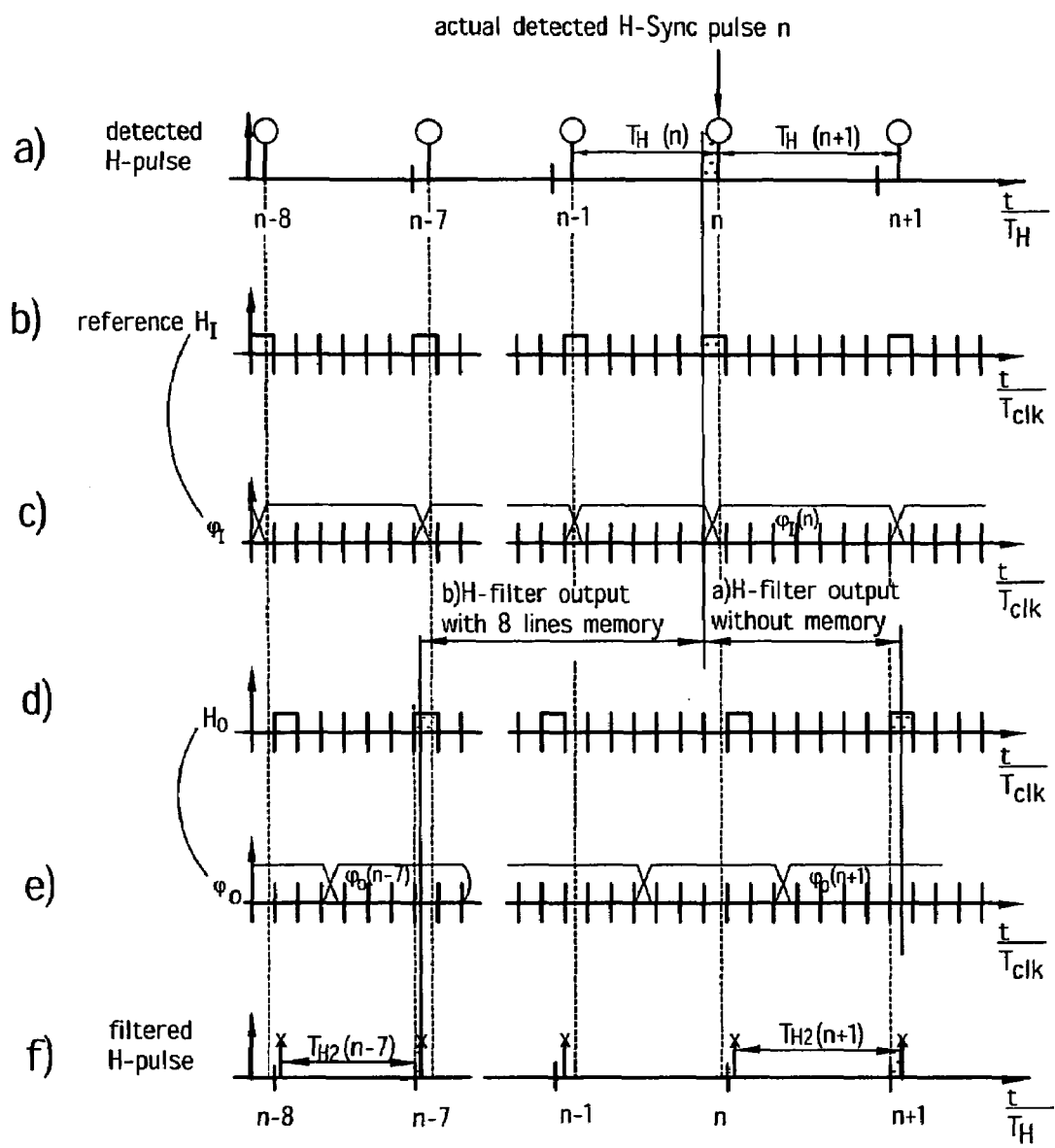
FIG. 10 the time positions of the detected $H_{sync}$ pulses, the output pulses of the $H_{sync}$ detector and the output pulses of the horizontal filter.

In FIG. 10 the timing of different types of signals is shown in an overview. From top to bottom the processing of the horizontal sync signals is visualized beginning with the detected $H_{sync}$ signals in FIG. 10a. On the abscissa of all diagrams in FIG. 10 the time grows from left to right. FIGS. 10a to 10c correspond to the illustration in FIGS. 6b to 6d describing the output of the $H_{sync}$ detector 23 (FIG. 2). The output signals $H_I$ and $\phi_I$ are provided to H-filter 24 to generate the filtered signals $H_o$ and $\phi_o$ (FIGS. 10d, 10e) supplied to the µP 19 and the pixel interpolation filter 9, respectively.

Finally, the filtered H pulse (FIG. 10f) is supplied to the deflection driver 22 (FIG. 2). Apart from the timing, FIG. 10 also illustrates the effect of the time delay. Using a line delay corresponds to case b) in FIG. 10b, where the estimation time point is approximately seven lines in the past, referring to the actual detected $H_{sync}$ pulse. This configuration is adapted to the present embodiment having eight lines of video memory. Of course, the size of the memory and the parameters of the line delay may be different in other embodiments of the invention. The line delay following the vertical signal processing block is needed to compensate the line delay of the video streams (Y/C or composite video) and uses the same delay time as the video stream line delay. The realization of the line delay for the vertical signal needs much less hardware; it is a binary signal (V-Imp, Field).

The last building blocks "Line-Memory Dual-Port" and "Synchronization-Logic" are used to synchronize the output signals for different display techniques.

The present embodiment of the invention uses a free-running output clock frequency and outputs a fixed number of pixels per line. Depending on the variation of horizontal and vertical input frequency, the number of lines per each output field can vary. Field synchronization is possible by changing the number of output lines per field. Therefore, this mode is ideally suited to drive CRTs for the following reasons.

i) Tube displays are horizontally stable, when the horizontal frequency of the driver stage is essentially constant (crystal locked).

ii) DC-coupled vertical CRT driver stages are able to adapt to changing line numbers per field without any visible degradation.

iii) This mode is also compatible with future multimedia-systems, where the usage of a line-locked clock system might be not acceptable.

A constant horizontal ($H_{sync}$) frequency can be obtained by the proposed sync algorithm, when some lines of buffer memory are used to compensate the different line durations $T_H$ between the buffer input and output during one field ($T_H \neq$ const., $T_{H,out}=$const.). This corresponds to a variation of the number of pixels per line at the buffer input and a constant number of pixels per line at the buffer output.

The vertical coupling is field synchronous. This means, that the vertical frequency of the output adapts at the end of each field to the vertical timing of the input to obtain correct field synchronization ($T_V = T_{V,out} \neq$ const.). The maximum needed line buffer size is defined by the maximum difference between the input and output memory addresses during one field. Hence, for a maximum averaged H-frequency variation of ±0.5% including phase-skips at the writing and constant output H-frequency at the reading, the line buffer memory size must at least be capable to store three video lines. The implementation of the vertical synchronization with changing vertical frequency in CRT-TVs does not present difficulties for a person skilled in the art. This type of synchronization can also be used for other display technologies like LCD or plasma displays.

It is noted that the use of a video line memory according to the invention for the purpose to take into account subsequent horizontal sync pulses is not limited to the use of FIR filters. The same concept can be applied with linear regression as filtering function. Filtering by linear regression with different regression lengths is disclosed in EP-A 0 899 945. In combination with the video line memory the known filter concept allows "to look into the future" to yield improved horizontal filtering. The results achieved by the different techniques will be discussed further below.

Figure 11:
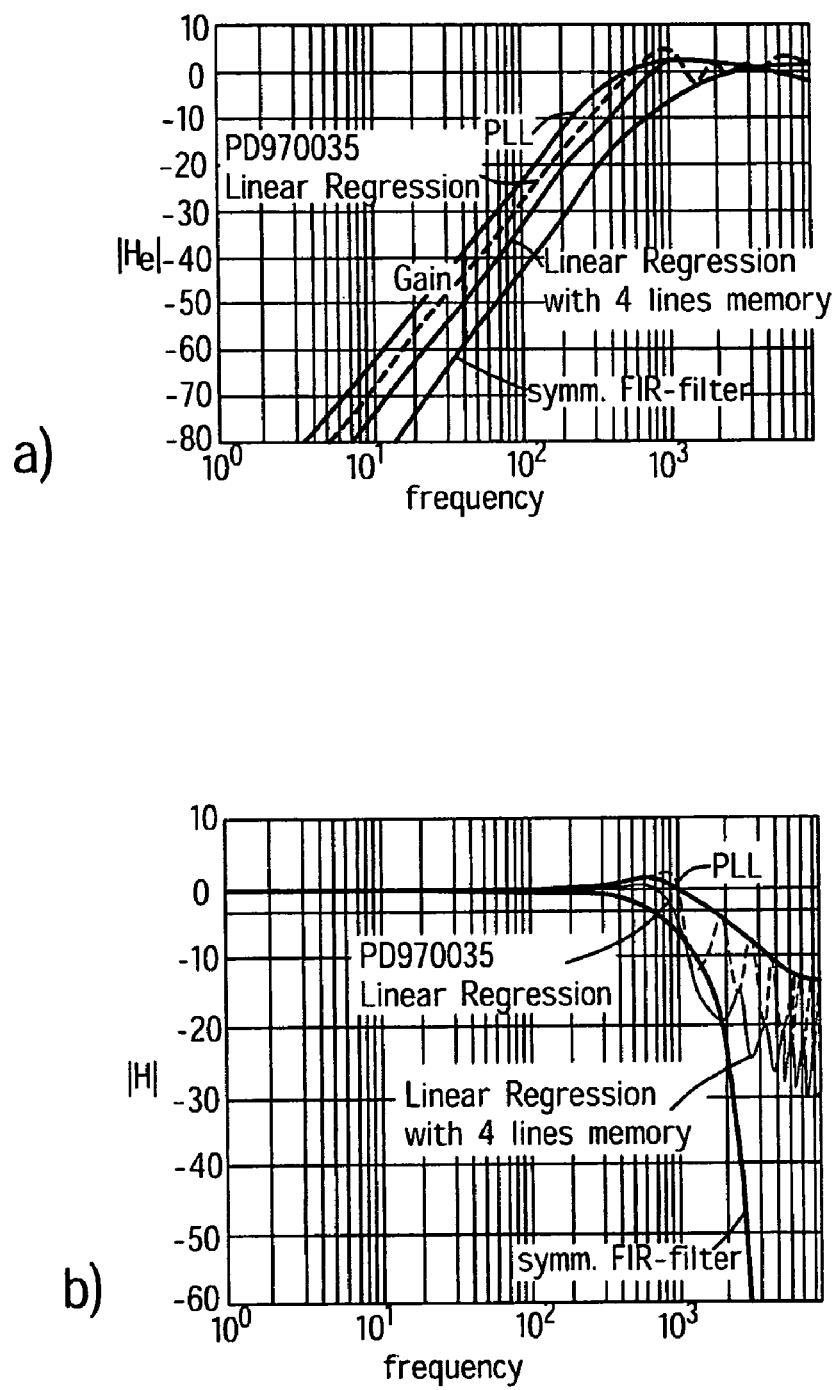
FIG. 11 a comparison of the error transfer function and transfer function of different types of $H_{sync}$ processing means.

The advantage of the new approach can be seen best in the "frequency domain". FIG. 11 shows a comparison between the conventional PLL, a system based on a linear regression filter technique without video line memory and with four lines of video memory and finally the actual new approach based on the FIR filter technology.

FIG. 11a shows the time-base variation tracking and FIG. 9b the noise suppression. To get a relevant measure of the tracking quality of the sync separation, FIG. 11a shows the error transfer function |1-$H_e$(f)|, where $H_e$(f) is the transfer function of the FIR filter. The error at typical distortion frequencies at approximately 30 Hz must be in the order of −60 dB to avoid visible jitter. FIG. 11b details the improvement of sync-noise suppression compared to PLL and also compared to the previous patent application. Alternatively, when approximating the Linear Regression by a FIR filter the filter quality is in between the symmetrical FIR filter and the linear regression without memory. This is a suitable solution for one to approximately five line delays or line memory resulting in asymmetrical FIR coefficients.

Figure 12:
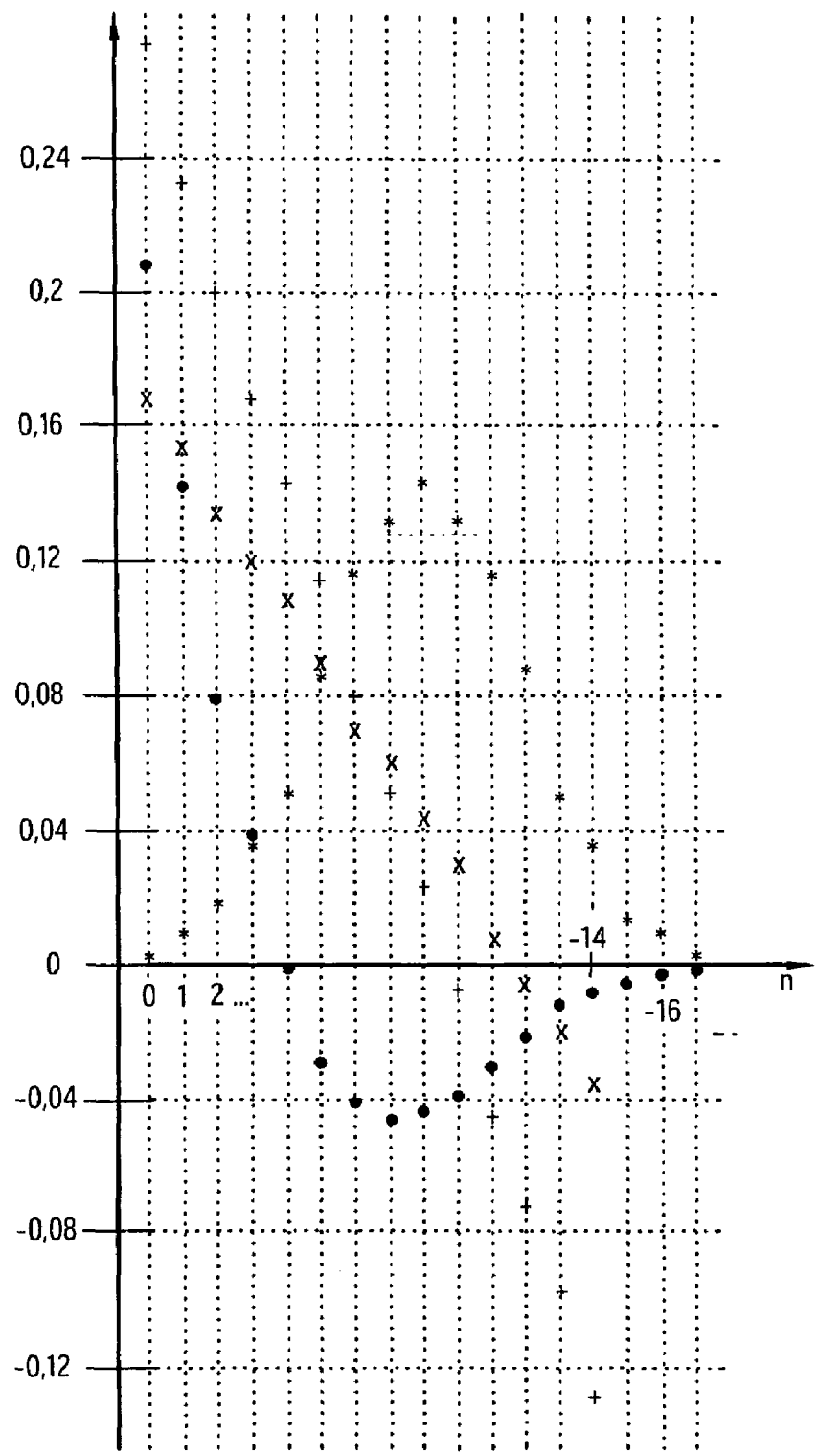
FIG. 12 the filter coefficients of different types of filters.

In FIG. 12 a diagram shows the asymmetrical and symmetrical impulse responses corresponding to filter coefficients of the various filter types described above. The + symbols indicate the coefficients for linear regression without memory; the x symbols indicate the coefficients for linear regression with a memory having a size of four lines; the asterisks * indicate the coefficients for a symmetrical FIR filter and finally the dots indicate the coefficients of a conventional PLL design with a fast time constant and infinite impulse response. On the abscissa of the diagram in FIG. 12 the indices of the filter coefficients are plotted. It is noted that the linear regression with and without memory and the PLL filter represent asymmetric filters in contrast to the symmetrical FIR filter.

Figure 13:
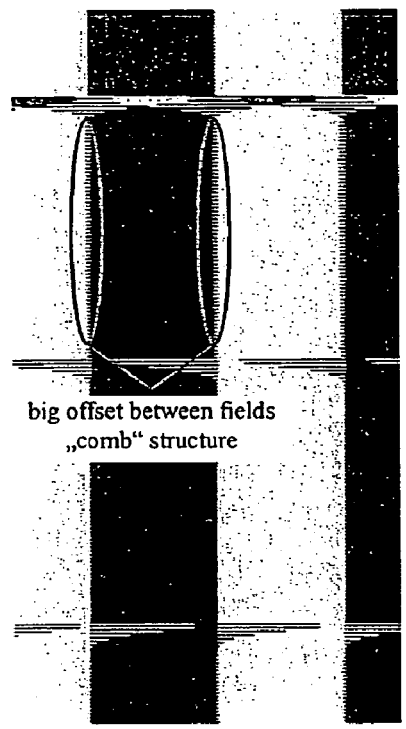
FIG. 13 a video picture exemplifying the improvement of the invention.
Figure 13:
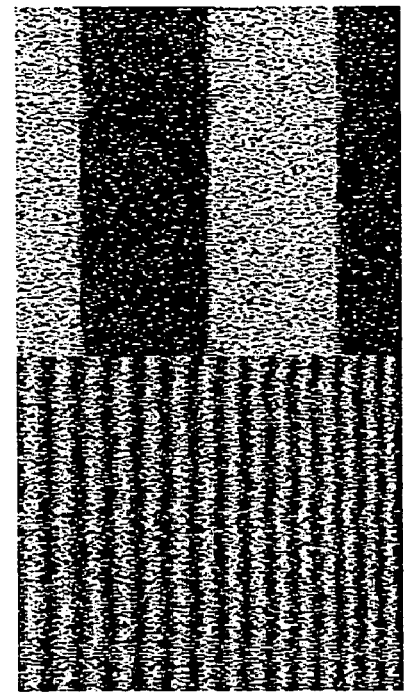
Figure 13:
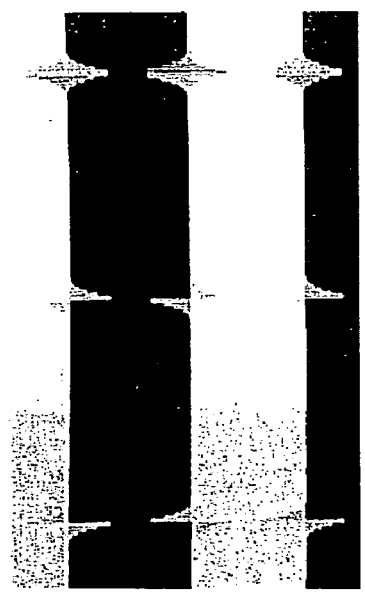
Figure 13:
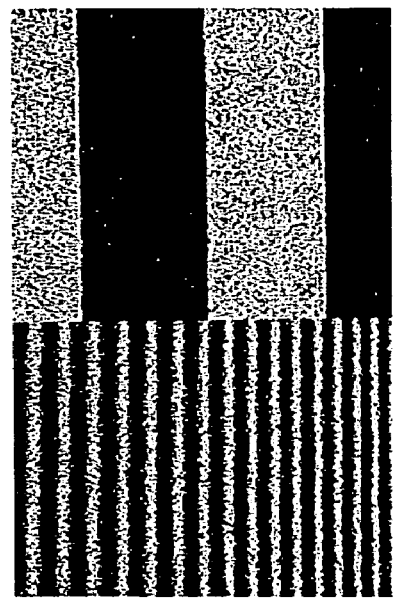

Instability in video cannot be printed on paper, however, FIG. 13 gives a rough impression about the achievable improvement. A reference measurement is made with Philips SAA7113H mounted on an original Philips evaluation board. FIG. 13a shows the phase-jump response of a synthetically generated VCR search mode and the noise response (SNR=12 dB). The typical instability between two phase jumps seen here as offset between two fields as a comb structure is clearly discernible. The comb structure is marked in FIG. 13a by ovals.

FIG. 13b shows the response of the proposed algorithm using a symmetrical FIR filter. The phase jump response is reduced to 50%. After the phase jump very good stability is achieved and no comb structure due to phase differences in different picture is visible. In addition, also the noise suppression is much better.

The invention claimed is:

1. Method for correcting line synchronization information of an analogue video line signal by
   (a) converting the analogue video line signal into a digital video signal,
   (b) analyzing the entire or a relevant part of the digital video signal comprising the line synchronization pulses to determine time instants defining the temporal position of the line synchronization pulse included in the analogue video line signal,
   comprising the following steps:
   (c) storing a predetermined number of video lines in a line delay, and
   (d) calculating a time instant for a video line preceding the currently received video line to mark the temporal position of the synchronization information of the video line, wherein the video line associated with the calculated time instant precedes the currently received video line by the predetermined number of video lines in the line delay, and wherein the time instant is a function of the line synchronization pulse positions of video lines including the currently received, at least one preceding and at least one succeeding video line.

2. Method according to claim 1, further comprising
   (e) convolving the entire or the relevant part of the digital video signal with a pattern function to generate a result function of the convolution operation, and
   (f) analyzing the result function of the convolution operation of step (e) to determine time instants defining the temporal position of the line synchronization pulse.

3. Method according to claim 2, comprising using an idealized tine synchronization pulse as the pattern function.

4. Method according to claim 1, comprising calculating the filtered time instant for a currently displayed video line by interpolation of the time instants determined for video lines preceding and following the currently displayed video line.

5. Method according to claim 4, comprising calculating the filtered time instant for a currently displayed video line by linear interpolation of the time instants determined for video lines preceding and following the currently displayed video line.

6. Method according to claim 1, comprising
   filtering the time instants by an FIR filter having a set of predetermined filter constants.

7. Method according to claim 6, comprising
   storing the defined time instants in associated delay elements,
   wherein the time instants represent the time constant of the delay element, and
   wherein the delay elements are incorporated in the FIR filter.

8. Apparatus for generating a line synchronization pulse from a analogue video line signal, comprising means for converting the analogue video line signal into a digital video signal and means for analyzing the entire or a relevant part of the digital video signal comprising the line synchronization pulses to determine time instants defining the temporal position of the line synchronization pulse included in the video line signal, comprising
   a line delay for storing a predetermined number of video line signals, and by means for calculating a time instant for a video line preceding the currently received video line to mark the temporal position of the synchronization information of the video line wherein the video line associated with the calculated time instant precedes the currently received video line by the predetermined number of video lines in the line delay, and wherein the time instant is a function of the line synchronization pulse positions of video lines including the currently received, at least one preceding and at least one succeeding video line.

9. Apparatus according to claim 8, comprising means for convolving the entire or the relevant part of the digital video signal with a pattern function.

10. Apparatus according to claim 8, comprising an FIR filter having a set of predetermined filter constants.

11. Apparatus according to claim 8, comprising a synchronization pulse detector to measure the time difference between two subsequent synchronization pulses.

12. Apparatus according to claim 11, wherein the synchronization pulse detector comprises two counters which are alternatingly reset.

13. Apparatus according to claim 11 wherein the synchronization pulse detector comprises a comparator a first input of which is selectively connectable with one of the counters, and the second input of which is provided with a predicted timing value generated by the FIR filter.

14. Apparatus according to claim 11, wherein the synchronization pulse detector supplies the measured time difference of two subsequent clock cycles in form of an integer number and a fraction of cycles of a system clock.

* * * * *